US006929227B2

United States Patent
Hofmann et al.

(10) Patent No.: US 6,929,227 B2
(45) Date of Patent: Aug. 16, 2005

(54) SYSTEM FOR CONNECTING MOUNTING RAILS

(75) Inventors: Armin Hofmann, Landsberg (DE); Armin Herb, Apfeldorf (DE); Stefan Unverzagt, Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/654,681

(22) Filed: Sep. 4, 2003

(65) Prior Publication Data
US 2004/0124319 A1 Jul. 1, 2004

(30) Foreign Application Priority Data
Sep. 5, 2002 (DE) .......................... 102 40 998

(51) Int. Cl.[7] .............................................. A47B 96/00
(52) U.S. Cl. .............................. 248/224.8; 248/225.11; 403/274; 403/282; 403/13; 403/14; 403/279; 411/180; 411/181
(58) Field of Search ................................. 411/180, 181, 411/103, 175; 403/274, 282, 13, 14, 279, 219, 231, 230, 24; 248/49, 224.8, 220.22, 225.11, 235, 250

(56) References Cited

U.S. PATENT DOCUMENTS

| 4,040,694 | A | * | 8/1977 | Lascarrou | .................. 312/263 |
| 5,167,478 | A | * | 12/1992 | Ramunas | ..................... 409/234 |
| 5,193,643 | A | * | 3/1993 | McIntyre | ..................... 180/312 |
| 5,489,173 | A | * | 2/1996 | Hofle | ........................... 411/85 |
| 5,713,651 | A | * | 2/1998 | Essig et al. | .............. 312/265.4 |
| 5,893,694 | A | * | 4/1999 | Wilusz et al. | ................ 411/112 |
| 6,260,197 | B1 | * | 7/2001 | Hoogewind | ........................ 2/8 |
| 6,494,639 | B1 | * | 12/2002 | Friend | ......................... 403/403 |
| 6,688,712 | B2 | * | 2/2004 | Adams et al. | ........... 312/265.1 |
| 6,719,481 | B2 | * | 4/2004 | Hoffmann | .................... 403/403 |

FOREIGN PATENT DOCUMENTS

| DE | 10052577 A1 | * | 4/2002 | ............. F16S/1/02 |
| GB | 2345239 A | * | 7/2000 | ........... A47B/47/03 |

* cited by examiner

Primary Examiner—Kimberly Wood
(74) Attorney, Agent, or Firm—Sidley Austin Brown & Wood, LLP

(57) ABSTRACT

A system (1) for connecting mounting rails comprises a base member (2) and an angular attachment member (3). The base member (2) has an opening (6.1, 6.2) in at least one lateral wall (4.1, 4.2 or 4.3) for passage therethrough of a bolt (7). The openings (6.1, 6.2) are each provided with a collar (10.1, 10.2), which can be brought into engagement with the opening (13) in the attachment member (3). The collar (10.1, 10.2) has at least in an axial region a conical section (8.2) shaped as a clamping cone. At the time of tightening the bolt 7, a form- and force-locking connection between the base member (2) and the attachment member (3) is created.

6 Claims, 3 Drawing Sheets

SYSTEM FOR CONNECTING MOUNTING RAILS

TECHNICAL FIELD

The invention relates to a system for connecting mounting rails, in particular for connecting C-shaped mounting rails, wherein the system comprises a base member and at least one substantially angular attachment member. The base member has in at least one lateral wall an opening, which is provided with a collar, for passage therethrough of a fastener. An attachment member has an opening for passage therethrough of the fastener, wherein the collar can be brought into engagement with the at least one opening in the attachment member.

PRIOR ART

Conduit installations are, for example, fastened to mounting rails that are arranged on a ceiling. For installation of conduit line arrangements erected in space are also used, which are generally comprised of individual standardized sections. Such arrangements are, for example, assembled from a plurality of interconnected C-shaped mounting rails. A variety of systems for connecting mounting rails is known, which make possible erection of two and three-dimensional arrangements comprised of mounting rails. Each type of connection requires specially configured connecting members for the connection.

DE 100 52 577 proposes a connecting system for connecting of mounting rails that comprises a base member and an angular attachment member. The attachment member can be detachably connected to the base member by a snap-in connection. The attachment member has snap-in bosses that can be brought into engagement with four bore holes arranged symmetrically around a fastener opening.

The drawback in the known solution is that the attachment members can be fastened to the base members only in the position predefined by the snap-in and complementary snap-in members. If the aforesaid attachment members are fastened to the base members without the snap-in and complementary snap-in members, the connection so established has only insufficient torsional stiffness.

SUMMARY OF THE INVENTION

The object of the present invention is to provide a connecting system, that has a low number of standardized parts and provides considerable flexibility in the configuration of the arrangements to be erected.

According to the invention, a system for connecting mounting rails, in particular for connecting C-shaped mounting rails, comprises a base member and at least one substantially angular attachment member. The base member has, in at least one lateral wall, an opening for passage therethrough of a fastener, the opening having a collar. The attachment member has an opening for passage therethrough of the fastener. The collar on the base member can be brought into engagement with the at least one opening in the attachment member. The collar has, at least in an axial region, a conical section configured as a clamping cone.

The base member is positioned along a first mounting rail and fixed thereto. Then the attachment member is fastened to the base member by tightening the fastener, whereby, using the conical section, a clamping connection between the two parts of the connecting system is established. By virtue of the clamping cone, a play-free centering of the connection is created and the connection exhibits a high torsional resistance. The attachment member can be arranged in any angular position about the axis of the opening of the base member. Accordingly, the mounting rails to be connected can be freely oriented and connected to each other and do not have to be arranged relative to each other in a set pattern.

Preferably, the collar has a conical section that abuts the at least one lateral wall of the base member and a truncated tubular section that extends from the conical section. The truncated tubular section of the collar serves as a centering means so that the attachment member can be guidingly connected to the base member. The conical section of the collar provides the form-locking connection between the attachment member and the base member at the time of tightening the fastener.

Preferably, the at least one opening in the base member has an inner thread and the fastener comprises a threaded section. The fastener engages in the inner thread. At the time of tightening of the fastener the opening in the attachment member is drawn over the conical section on the collar of the base member, which establishes the form-lock between the two parts in a preferred fashion. This pressure connection is further advantageous for the pull-out behavior of the fastener, because the threaded region in the opening on the base member is supported by the attachment member. The length of the threaded section is preferably selected so that in the tightened condition of the fastener it does not penetrate the plane that is formed by the inner surface of the respective lateral wall. Consequently, the attachment member can be arranged also on the sides, for example, of a C-shaped mounting rail, which has no recesses.

Advantageously, the angle of inclination of the conical section is less than 15°, preferably less than 8°. As a factor of the deformability of the material chosen for forming the base member or the attachment member, the size of the angle of the conical section can be selected. For parts that are manufactured from sheet metal, for example in a punch/bend process, the angle of the conical section is preferably less than 8°. It is thus made possible that the attachment member with its opening can be slid over the collar on the base member and the desired clamping or compression connections so established.

Preferably, the base member is manufactured from a material having a higher strength than the attachment member. The zone of the opening in the attachment member can, in this embodiment, deform so considerably at the time of tightening that a form-locking connection is possible without an elevated tightening torque having to be exerted on the fastener for establishing the connection.

Preferably, the external surface of the conical section has a profiling, optionally knurling. With the profiling, the torsional stiffness of the connection between the base member and the attachment member is additionally improved.

Other advantageous embodiments and combinations of the features of the invention will become apparent from the following detailed description and the ensemble of patent claims.

BRIEF DESCRIPTION OF THE DRAWINGS

The invention will be more completely described in the following read together with an exemplary embodiment, wherein.

In principle, identical parts in the figures are identified using the same reference numerals.

DETAILED DESCRIPTION OF THE INVENTION

Figure 1:
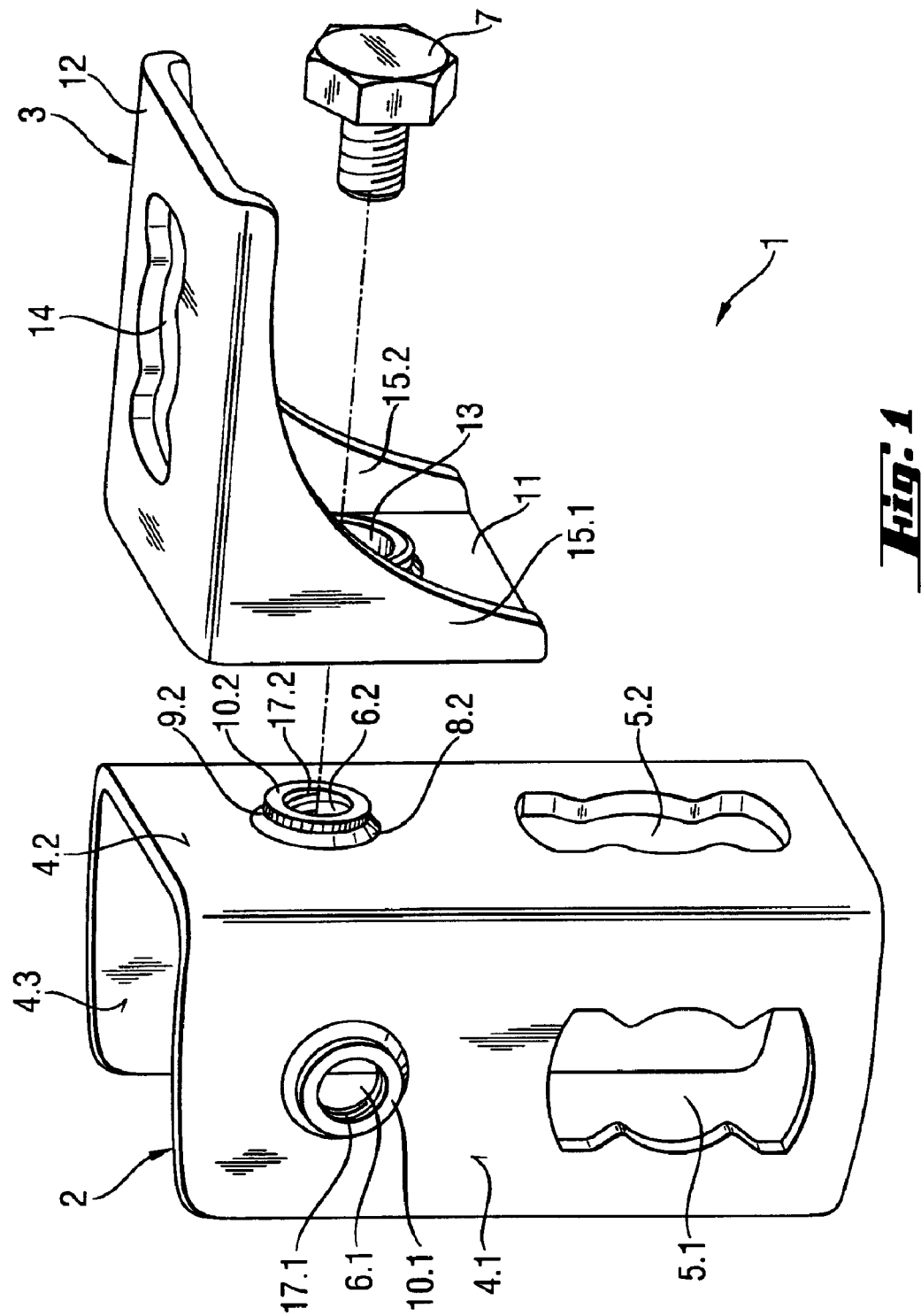
FIG. 1 is a exploded view of the system according to the invention with a base member and an attachment member.

FIG. 1 represents an exploded view of the system according to the invention having a base member and an attachment member. The connection system 1 comprises a U-shaped base member 2 and an angular attachment member 3. The base member 2 is manufactured from a higher-strength material than the attachment member 3.

The base member 2 has openings 5.1, 5.2 or 5.3 on all three lateral walls 4.1, 4.2 and 4.3 for passage therethrough of a rail bolt for fastening the base member 2 to a first mounting rail. Preferably, so called quick-check bolts are used, as are commonly used in pipeline installations in conjunction with mounting rails. Furthermore, an opening 6.1, 6.2 or 6.3 having an inner thread 17.1, 17.2 or 17.3 is provided on each lateral wall 4.1, 4.2 and 4.3 and into which the fastener, the bolt 7 for example, can engage for fastening the attachment member 3 to the base member 2. The openings 6.1, 6.2, and 6.3 have a collar 10.1, 10.2, and 10.3 that has a conical section 8.2 and a truncated tubular section 9.2.

The angular attachment member 3 has a first limb 11 and a second limb 12. An opening 13 for passage therethrough of the bolt 7 is provided on the first limb 11. An opening 14 for passage of a rail bolt is provided on the second limb 12, so that a second mounting rail can be fastened to the attachment member 3. In order to increase the carrying load of the angular attachment member 3, it has reinforcement plates 15.1 and 15.2 in the lateral corner zones of the two limbs 12 and 13.

Figure 2:
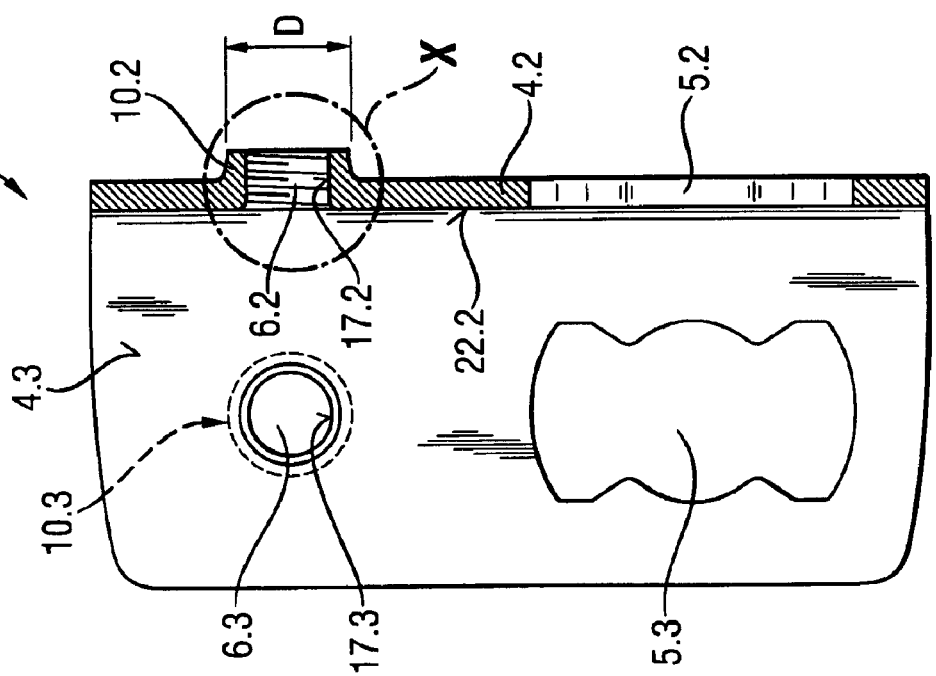
FIG. 2 is a section through the base member.

FIG. 2 represents a section through the base member. The external diameter D of the truncated tubular section 9.2 of the collar 10.1, 10.2, 10.3 is configured to be smaller than the inside diameter d of the opening 13 in the attachment member 3 so that the collar 10.1, 10.2 or 10.3 can penetrate into the opening 13. A knurling 16.2 can be provided on the external surface of the collar 10.1, 10.2 and 10.3 (note FIG. 4).

Figure 3:
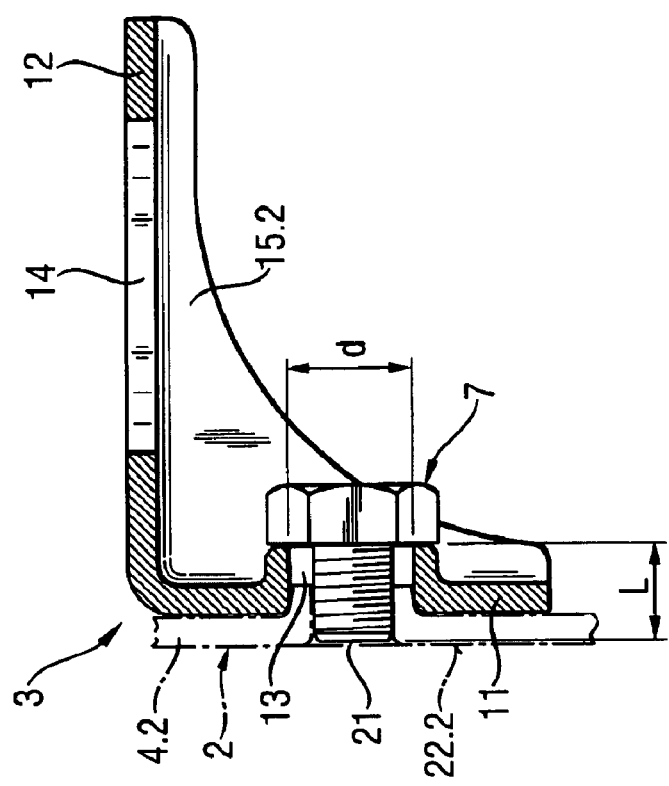
FIG. 3 is a section through the attachment member.

FIG. 3 represents a section through the attachment member. The length L of the bolt 7 is selected in such a fashion that in the assembled condition of the base member 2 with the attachment member 3 the leading end or tip 21 of the bolt does not penetrate the plane that is formed by the corresponding inside, e.g. the inside 22.2 of the lateral wall 4.2, at which the attachment member 3 is connected to the base member 2. In this fashion it is possible that the connecting system 1 can be arranged at any position on the mounting rail.

Figure 4:
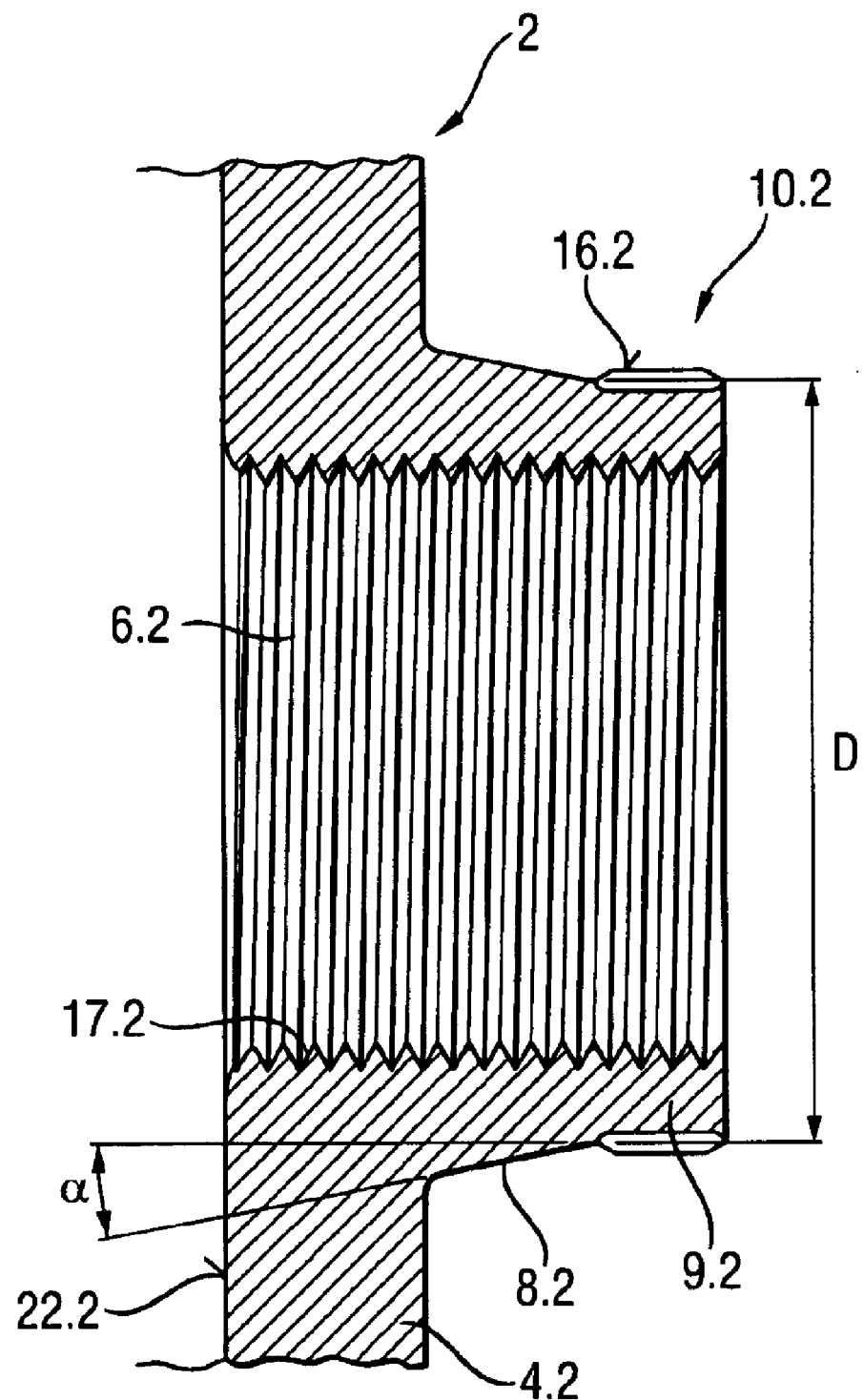
FIG. 4 represents a detailed cutout X of FIG. 2.

FIG. 4 represents an enlarged detailed cutout X of FIG. 2. The collar 10.2 of the opening 6.2 has a conical section 8.2 that abuts the lateral wall 4.2 of the base member, and a truncated tubular section 9.2 that abuts with the conical section 8.2. The angle of inclination α of the conical section 8.2 is 7°, wherein the conical section 8.2, relative to the axis of the opening 6.2, in the direction of the lateral wall 4.2, expands radially outwardly.

The base member 2 is displaced along the first mounting rail until the desired position of the structural part 2 on the mounting rail is reached. Then, depending on the orientation of the mounting rail, the rail bolt is introduced into one of the openings 5.1, 5.2 or 5.3 of the base member 2. After the base member 2 is fixed in the desired position on the mounting rail, the attachment member 3 is arranged on the lateral wall 4.1, 4.2 or 4.3 of the base member 2, on which the second mounting rail is to be attached. The following description refers to the connection of the attachment member 3 to the lateral wall 4.2 of the base member 2. Using the truncated tubular section 9.2 on the collar 10.2, which penetrates into the opening 13 of the limb 11 of the attachment member 2, the attachment member 3 is guided in the direction of the base member 2. Once the edge of the opening 13 abuts on the conical section 8.2, the bolt 7 is brought to engage with the inner thread of the opening 6.2 in the lateral wall 4.2. The attachment member 3 is brought into position, in which the second mounting rail connects to the first mounting rail, by rotating the bolt 7 along its longitudinal axis. When tightening the bolt 7, the first limb 11 of the attachment member 3 is drawn up to the lateral wall 4.2, whereby the edge of the opening 13 in the attachment member 3 moves over the conical section 8.2 and the opening 13 expands as a result of the different material pairing. Already with the occurrence of a bolt torque on the bolt 7 of approximately 40 Nm, the base member 2 and the attachment member 3 are compressed together, so that the connection between the two parts is form- and force-locking.

In summary, it must be stated that a system for connecting mounting rails is provided, which has few component parts. The attachment member can be freely oriented on the base member, which affords considerable flexibility in configuring the construction to be created. Using the system according to the invention, the connection established between the connected mounting rails can be centered with an absence of play and has high torsional stiffness, whereby the system can satisfy demanding requirements.

What is claimed is:

1. A system for connecting mounting rails, comprising base member (2) for attachment to the mounting rail and at least one substantially angular attachment member (3) for connection to said base member, said base member has a lateral wall (4.1, 4.2, 4.3) with a first surface and a second surface with the first surface arranged to contact a first surface of said attachment member (3), said base member (2) has an axially extending opening (6.1) with an inside thread (17) extending through said first and second surfaces thereof, a threaded fastening means (7) for connecting said attachment member (3) to said base member (2), said base member (2) has an axially extending collar (10.1) formed on and extending axially outwardly from the first surface thereof, said collar (10.1) has an axially extending outer conical section (9.2) tapering inwardly from said first surface of said base plate and arranged to contact said attachment member (3), said attachment member has an axially extending opening (13) arranged to receive therein said conical section (8.1) of said collar (10.1), said base member (2) is formed of a higher strength material than said attachment member so that when said fastening means (7) is threaded into said inside thread (17) of said base member (2) said conical section (8.1) deforms said opening (13) of said attachment member and said base member (2) and attachment member (3) are compressed together providing a form and force locked engagement therebetween.

2. A system, as set forth in claim 1, wherein said fastening means (7) comprises a threaded bolt (7) having a head arranged to project outwardly and bear against said attachment member (3).

3. A system, as set forth in claim 1, wherein said outer conical section (8.1) has an angle of inclination of less than 15°.

4. A system, as set forth in claim 1, wherein said outer conical section (8.1) has an angle of inclination of less than 8°.

5. A system, as set forth in claim 1, wherein the outer end of said outer conical section (8.1) has a profiled surface.

6. A system, as set forth in claim 5, wherein said profiled surface is a knurled surface.

* * * * *